(12) United States Patent
Yu et al.

(10) Patent No.: US 11,304,144 B2
(45) Date of Patent: Apr. 12, 2022

(54) TECHNIQUES OF PAGING OCCASION BURST HANDLING

(71) Applicant: Intel Corporation, Santa Clara, CA (US)

(72) Inventors: Zhibin Yu, Unterhaching (DE); Bertram Gunzelmann, Koenigsbrunn (DE); Jianqiang Rao, Unterhaching (DE); Rui Huang, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 17/251,219

(22) PCT Filed: Dec. 18, 2018

(86) PCT No.: PCT/CN2018/121789
§ 371 (c)(1),
(2) Date: Dec. 11, 2020

(87) PCT Pub. No.: WO2020/124372
PCT Pub. Date: Jun. 25, 2020

(65) Prior Publication Data
US 2021/0329562 A1  Oct. 21, 2021

(51) Int. Cl.
H04W 52/02 (2009.01)
H04W 76/28 (2018.01)
H04W 68/00 (2009.01)

(52) U.S. Cl.
CPC ... *H04W 52/0274* (2013.01); *H04W 52/0216* (2013.01); *H04W 68/005* (2013.01); *H04W 76/28* (2018.02)

(58) Field of Classification Search
None
See application file for complete search history.

(56) References Cited

U.S. PATENT DOCUMENTS

| 11,184,877 | B2* | 11/2021 | Deng | H04W 68/025 |
| 2009/0310503 | A1* | 12/2009 | Tenny | H04W 76/28 370/252 |

(Continued)

FOREIGN PATENT DOCUMENTS

| CN | 108024331 A | 5/2018 |
| CN | 108476420 A | 8/2018 |

(Continued)

OTHER PUBLICATIONS

Huawai et al., "Definition of Paging Occasion", Apr. 16-20, 2018, 5 pages, R2-1805758, 3GPP TSG-RAN WG2 #101bis, Sanya, China.

(Continued)

*Primary Examiner* — Jamaal Henson
(74) *Attorney, Agent, or Firm* — Viering, Jentschura & Partner mbB

(57) ABSTRACT

The disclosure relates to a User Equipment, UE, circuitry, comprising: a Radio Frequency, RF, circuitry, configured to receive RF signals from a serving cell, the RF signals comprising reference signals and a burst of paging occasions, POs within a Discontinuous Reception, DRX, cycle; and a baseband circuitry, configured to: select a candidate set of POs from the burst of POs based on a priority metric with respect to the reference signals which are associated to the POs, and set a power switching pattern of the RF circuitry based on the selected candidate set of POs.

20 Claims, 7 Drawing Sheets

(56) References Cited

U.S. PATENT DOCUMENTS

| | | | |
|---|---|---|---|
| 2017/0230932 A1* | 8/2017 | Challa | H04W 68/02 |
| 2018/0220345 A1* | 8/2018 | Moon | H04W 36/24 |
| 2019/0261296 A1 | 8/2019 | Li et al. | |
| 2020/0059891 A1 | 2/2020 | Huang et al. | |
| 2020/0275407 A1 | 8/2020 | Liu | |
| 2021/0337507 A1* | 10/2021 | Selvaganapathy | H04W 76/28 |

FOREIGN PATENT DOCUMENTS

| | | | |
|---|---|---|---|
| CN | 108632998 A | 10/2018 | |
| CN | 108811083 A | 11/2018 | |
| EP | 3606198 A1 | 2/2020 | |
| EP | 3661277 B1 * | 7/2021 | H04W 68/00 |
| GB | 2577316 A * | 3/2020 | H04W 68/005 |
| WO | WO-2009152367 A1 * | 12/2009 | H04W 68/00 |
| WO | 2018082575 A1 | 5/2018 | |

OTHER PUBLICATIONS

Media Tek Inc., "Paging Occasion in NR", Apr. 16-20, 2018, 5 pages, R2-1805106, 3GPP TSG-RAN WG2 Meeting #101bis, Sanya, China.

ZTE et al., "Calculation of paging occasion in NR", Jan. 22-26, 2018, 4 pages, R2-1800463, 3GPP TSG-RAN WG2 NR Ad hoc 1801, Vancouver, Canada.

International Search Report issued for the corresponding PCT application No. PCT/CN2018/121789, dated Sep. 3, 2019, 4 pages (for informational purpose only).

* cited by examiner

TECHNIQUES OF PAGING OCCASION BURST HANDLING

CROSS REFERENCE TO RELATED APPLICATIONS

This is a national phase of International Application PCT/CN2018/121789, which was filed on Dec. 18, 2018, the entire contents of which are incorporated herein by reference.

FIELD

The disclosure relates to techniques of paging occasion burst handling for robust paging decoding and UE power saving, in particular in 5G RRC_IDLE (Radio Resource Control Idle) mode.

BACKGROUND

Discontinuous reception (DRX) is specified in both 3GPP 4G LTE and 5G NR standard for UE power saving in RRC_IDLE mode. In RRC_IDLE mode, UE 110 periodically wakes up per DRX cycle 112 for a short duration (on-duration) to decode the downlink (DL) paging message from base station 120 which is carried by PDSCH (physical downlink shared channel) within a paging occasion (PO) as shown in FIG. 1. Afterwards, UE 110 enters back into sleep mode until the next on-duration is reached. The periodicity of paging messages is called DRX cycle length which can be from 0.32 seconds up to 2.56 seconds.

In contrast to 4G LTE, in 5G NR, per DRX cycle, the paging message can be repeated within a burst 111 of Time-Domain-Multiplexed (TDMed) POs. Hereby, each PO within the burst 111 is associated to a different SSB (synchronization signal block) index, which is further associated with a different TX beam from gNB (base station) side. The number of POs within a PO burst 111 can be from 1 up to 64. In some UE mobility scenarios, the selected POs cannot be reliably decoded.

BRIEF DESCRIPTION OF THE DRAWINGS

The accompanying drawings are included to provide a further understanding of aspects of the disclosure and are incorporated in and constitute a part of this specification. The drawings illustrate aspects of the disclosure and together with the description serve to explain principles of the various aspects. Other aspects of the disclosure and many of the intended advantages of these aspects will be readily appreciated as they become better understood by reference to the following detailed description.

DETAILED DESCRIPTION

Figure 1:
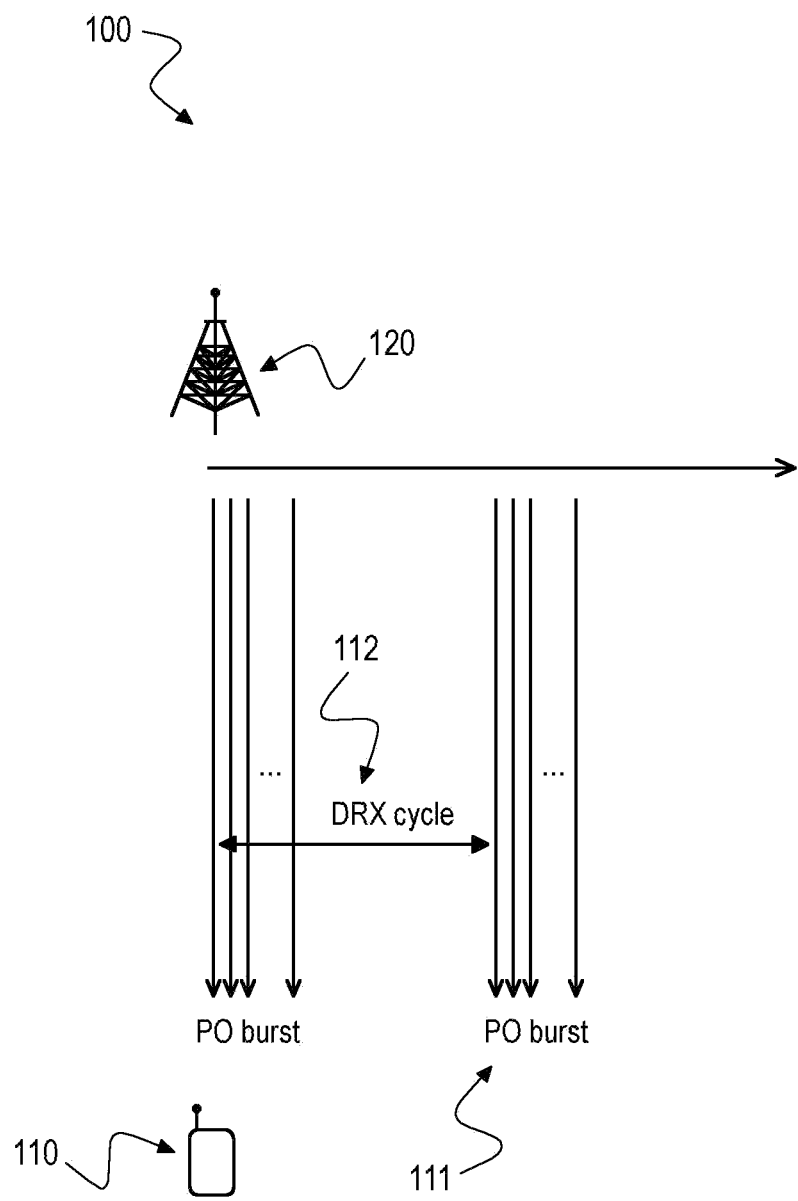
FIG. 1 is a schematic diagram of a communication system 100 with a base station 120 and a user equipment (UE) 110 illustrating burst of paging occasions (POs) 111 sent by the base station 120 within DRX cycles 112.

In the following detailed description, reference is made to the accompanying drawings, which form a part thereof, and in which is shown by way of illustration specific aspects in which the invention may be practiced. It is understood that other aspects may be utilized and structural or logical changes may be made without departing from the scope of the present invention. The following detailed description, therefore, is not to be taken in a limiting sense, and the scope of the present invention is defined by the appended claims.

The following terms, abbreviations and notations will be used herein:

5G NR: 3GPP fifth generation new radio specifications
UE: User Equipment
LTE: Long Term Evolution
RF: Radio Frequency
UL: uplink
DL: downlink
PDCCH: physical downlink control channel
PDSCH: physical downlink shared channel
PO: paging occasion
DRX: discontinuous reception
SSB: synchronization signal block
QCL: quasi co-location
QCLed: quasi co-located
AGC: automatic gain control
TDM: time division multiplex
FDM: frequency division multiplex
FR1: frequency range 1 according to 5G NR
FR2: frequency range 2 according to 5G NR
LLR: logarithmic likelihood ratio
DMRS: demodulation reference signals It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The techniques described herein may be implemented in wireless communication networks, in particular communication networks based on mobile communication standards such as 5G new radio (NR), in particular for millimeter-wave data rate. The techniques may also be applied in LTE networks, in particular LTE-A and/or OFDM and successor standards. The methods are also applicable for high speed communication standards from the 802.11 family according to the WiFi alliance, e.g. 802.11ad and successor standards. The methods and devices described below may be implemented in electronic devices such as cellular handsets and mobile or wireless devices or User Equipment communicating with radio cells such as access points, base stations, gNodeBs and/or eNodeBs. The described devices may include integrated circuits (ICs) and/or passives and may be manufactured according to various technologies. For example, the circuits may be designed as logic integrated circuits, ASICs, analog integrated circuits, mixed signal integrated circuits, optical circuits, memory circuits and/or integrated passives.

As described above discontinuous reception (DRX) is specified in both 3GPP 4G LTE and 5G NR standard for UE power saving in RRC_IDLE mode. In RRC_IDLE mode DRX operations, UE periodically wakes up for a short duration (on-duration) to decode the downlink (DL) paging occasion (PO) from the serving cell 120. And then UE 110 enters back into sleep mode until the next on-duration is reached. The periodicity of POs 111 is called DRX cycle length which can be from 0.32 seconds up to 2.56 seconds. Note that in IDLE mode, uplink (UL) transmissions are disabled in UE side (UE TX path is switched off). Thus, the UE modem power consumption is mainly contributed by the RF receiver (including external LNAs, band filters, etc.) for PO reception, and it is scaled with RX on-duration length in each DRX cycle.

The disclosure deals with, for example, the question how to improve PO detection, in particular in UE mobility scenarios, for example when UE is quickly moving at beam edges. In LTE, for PO reception in each DRX cycle, in order to overcome the gain/timing offset/frequency drifts after a long sleep time, UE needs turn on the RF receiver at least 1 sub-frame earlier ("warm-up sub-frame") before the allocated PO, and make use of the cell specific reference signals (CRS) within the warm-up sub-frame to estimate and compensate the AGC gain/timing drifts/frequency drifts in order to ensure the demodulation performance for the follow-up PO. In 5G NR, however, CRS is no longer available in the DL signals. Instead, a NR synchronization signal block (SSB), which is quasi co-located (QCLed) with the allocated PO and scheduled before a PO, is the working assumption to be used by UE for AGC/timing/frequency tracking "warm-up" for the follow-up PO reception.

Recently, 3GPP has frozen specification for 5G NR and TS 38.104 section 5.2 provides the list of bands in which NR (New Radio) can operate. As per 3GPP release 15, these frequency bands are designated for different frequency ranges (FR) and current specification (Release) defines them as FR1 and FR2. FR1 is defined with frequency range between 450 MHz and 6000 MHz. FR2 is defined with frequency range between 24250 MHz and 52600 MHz. Apart from FR (frequency range) NR bands can be classified into three categories: 1) Frequency Division Duplex Bands (FDD); 2) Time Division Duplex Bands (TDD); and 3) Supplementary Bands (SUL): Downlink Supplement Bands and Uplink Supplement Bands.

FIG. 1 is a schematic diagram of a communication system 100 with a base station 120 and a user equipment (UE) 110 illustrating burst of paging occasions (POs) 111 sent by the base station 120 within DRX cycles 112. UE 110 periodically wakes up per DRX cycle 112 for a short duration (on-duration) to decode the downlink (DL) paging message from base station 120 which is carried by PDSCH within a paging occasion (PO) as shown in FIG. 1. Afterwards, UE 110 enters back into sleep mode until the next on-duration is reached.

In contrast to 4G LTE, in 5G NR, per DRX cycle, the paging message can be repeated within a burst 111 of Time-Domain-Multiplexed (TDMed) POs. Hereby, each PO within the burst 111 is associated to a different SSB index, which is further associated with a different TX beam from gNB side. The number of POs within a PO burst 111 can be from 1 up to 64. When the activation rate for SSB based beam acquisition is low, or when SSB burst have very high repetition period (e.g. can be up to 160 ms), or when the advancing SSB burst has high timing offset to a PO burst 111, the SSB based beam acquisition results can be out-of-date. As a result, the selected PO instance, which is selected based on the SSB beam acquisition, cannot be reliably decoded. This issue is particularly critical when UE is quickly moving at beam edges. Techniques presented in this disclosure provide a solution for improving PO detection, in particular in UE mobility scenarios when UE is quickly moving, e.g. at beam edges.

Figure 2:
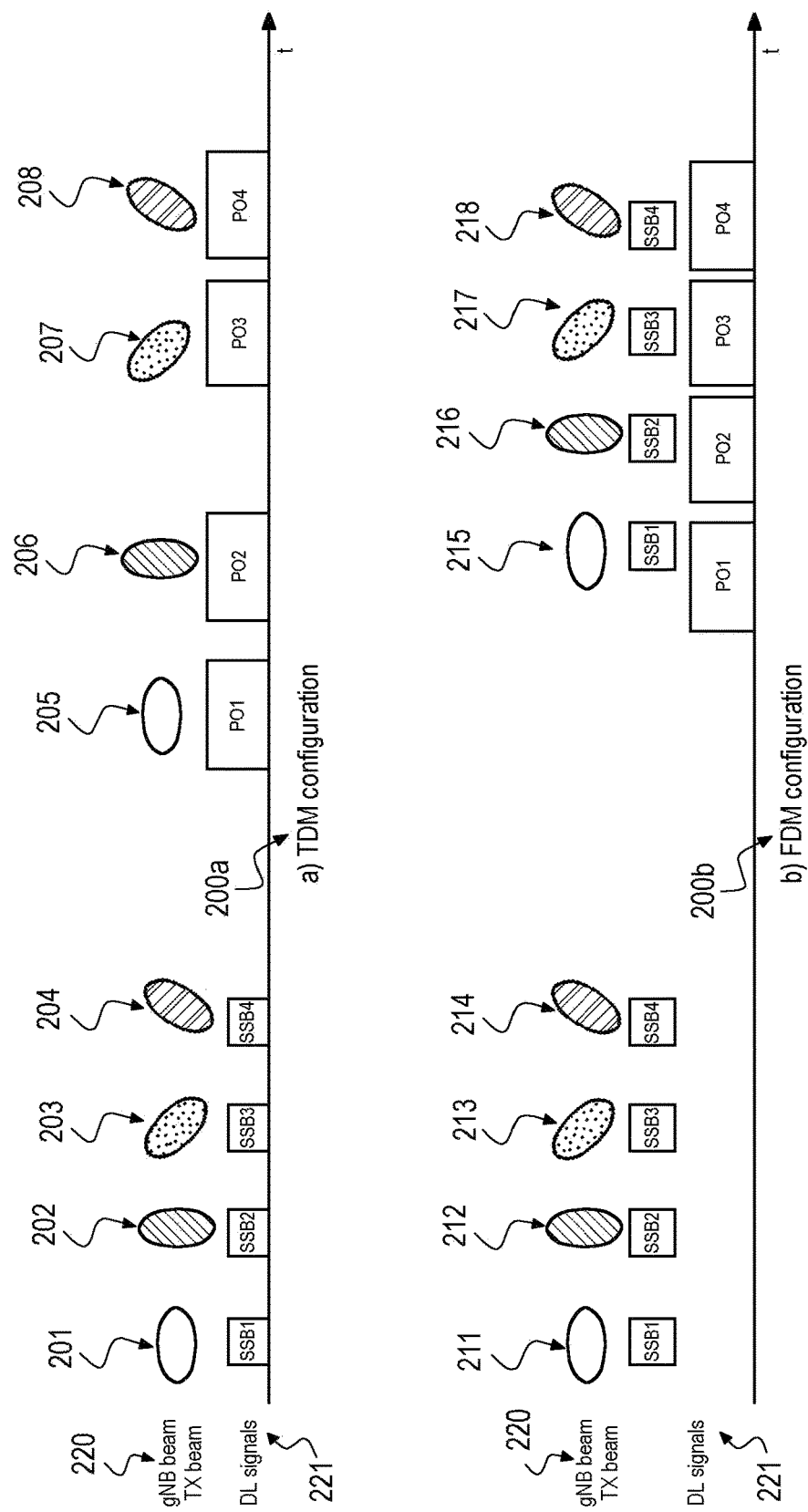
FIG. 2 is a schematic diagram illustrating examples of a PO burst within a DRX cycle in 5G NR IDLE mode for a TDM configuration 200a and a FDM configuration 200b according to the disclosure.

FIG. 2 is a schematic diagram illustrating examples of a PO burst within a DRX cycle in 5G NR IDLE mode for a TDM configuration 200*a* and a FDM configuration 200*b* according to the disclosure. FIG. 2 shows different beams 201, 202, 203, 204, 205, 206, 207, 208 (gNB beam TX beams 220) with corresponding SSBs and POs (DL signals 221) for the TDM configuration 200*a* and different beams 211, 212, 213, 214, 215, 216, 217, 218 (gNB beam TX beams 220) with corresponding SSBs and POs (DL signals 221) for the FDM configuration 200*b*

As described above with respect to FIG. 1, the paging message can be repeated within a burst of Time-Domain-Multiplexed (TDMed) POs, e.g. PO1, PO2, PO3, PO4 as shown in FIG. 2. Hereby, each PO within the burst is associated to a different SSB index, e.g. SSB1, SSB2, SSB3, SSB4 as shown in FIG. 2, which is further associated with a different TX beam 201, 202, 203, 204 from gNB side. The number of POs within a PO burst can be from 1 up to 64. FIG. 2 shows an example where the number of POs (and correspondingly the number of SSBs) is 4. Note that a SSB and the associated PO can be TDMed as shown in the upper configuration 200*a* of FIG. 2 or Frequency-Domain-Multiplexed (FDMed) as shown in the lower configuration 200*b* of FIG. 2. Considering that SSB repetition period (RP) is shorter than that of DRX cycle length, it means even for FDM typed allocation, there are still periodic SSB bursts which are allocated before a PO burst. Therefore, UE can apply early beam acquisition or early RX "warm-up" operations (AGC, timing/frequency estimation) before a PO reception for both TDMed 200*a* and FDMed 200*b* cases.

Based on the pattern in FIG. 2, the procedure for acquiring the paging message can be described as follows: UE first applies beam acquisition based on SSB bursts (For FR1, the acquisition is for TX beams; For FR2, the acquisition is for TX/RX beam pairs) to select the best beam (pair). And then, UE receives and decodes the PO which is associated to the best SSB beam quality obtained from the beam acquisition processing. Note that, paging message is decoded every DRX cycle, while SSB based beam acquisition can be made in a much lower activation rate, e.g. in an adaptive and opportunistically manner.

This disclosure presents a solution for improving PO detection, in particular in UE mobility scenarios. The disclosure particularly presents a set of methods for 5G NR IDLE mode PO handling, so as to optimize the tradeoff between paging message decoding robustness and UE power consumption as described in the following.

In a first method a sub-set of high priority PO candidates is down-selected (or simply selected) from the PO burst for RX reception in DRX cycles. The priority used to down-select a good PO candidate in one DRX cycle can be based on the beam qualities measured from the associated SSBs, or from POs in historical DRX cycles. In addition, the priority can be further based on the time-order information of a PO within a PO burst. For example, with the similar beam qualities, the earlier allocated PO candidate has higher priority than later allocated PO candidate. That is because an earlier allocated PO candidate has lower penalty but failed to be decoded: when UE fails decoding of an earlier allocated PO candidate, it still has the chance to receive and decode later PO candidates within a same DRX cycle, but not vice-versa.

The second method is an adaptive and iterative RX control and PO decoding procedure for handling the pre-selected PO candidate set within a DRX cycle: Turn on RF RX for receiving a pre-selected PO candidate and decode the PDCCH. When PDCCH decoding fails, early turn off RF RX until the next pre-selected PO instance; When PDCCH decoding succeeds, decode the associated PDSCH. When PDSCH decoding succeeds, turn off RF RX without further receiving more pre-selected PO candidates until the next DRX cycle; When PDSCH decoding fails, store the PDSCH LLR soft-bits and combine the PDSCH LLR soft-bits with that from the PDSCH in the next PO candidate within a same DRX cycle. When paging decoding still fails after receiving the last time-allocated PO candidate in the pre-selected candidate set, UE dynamically revises the candidate set by further receiving the remaining un-selected PO instances to continue with decoding even they are not pre-selected.

In a third method, in particular for FR2, when PO and SSB are FDMed and when the PO is configured to be single layer transmission, for a pre-selected PO candidate, UE further compares the pre-measured RX beam qualities from the two polarizations. When one of the polarization is significantly weaker, UE selects only the RX beam pattern of the strongest polarization for PO reception, while it further sweeps the RX beam pattern of another polarization and makes use of the FDMed SSB to continue with RX beam acquisition in parallel. This reduces the RX on-duration overhead for FR2 RX beam acquisition because it can be done in parallel with PO reception.

The solution according to the three methods described above provides optimized trade-off between paging decoding robustness and IDLE RX on-duration length for PO reception which is critical for UE power saving in IDLE mode. Exemplary implementations of this solution are presented in the following.

Figure 3:
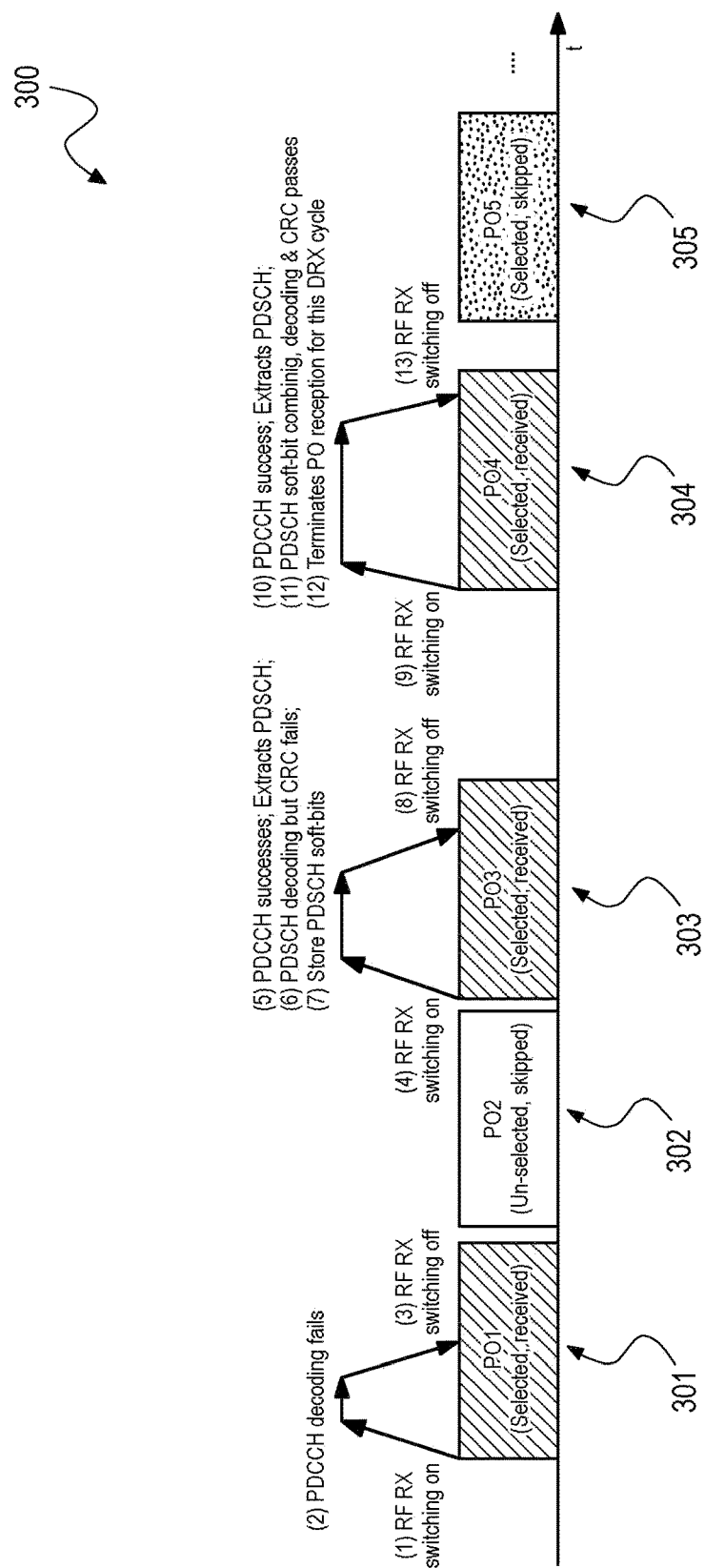
FIG. 3 is a schematic diagram illustrating one example of optimized PO burst handling based on the introduced methods according to the disclosure.

FIG. 3 is a schematic diagram illustrating one example of optimized PO burst handling based on the introduced methods according to the disclosure.

In this disclosure a set of optimization methods for 5G NR IDLE mode PO burst handling is presented, so as to minimize the RF ON duration for PO reception, while still maintaining robust paging message decoding performance in DRX operations. FIG. 3 illustrates one exemplary implementation of these methods.

In the example of FIG. 3, the paging message carried by PDSCH is repeated over 5 POs 301, 302, 303, 304, 305 within a PO burst in a DRX cycle, e.g. corresponding to a PO burst 111 as described above with respect to FIG. 1. In this example, based on historical beam measurement (SSB or POs in historical DRX cycles) in advance, {PO1, PO3, PO4 and PO5} 301, 303, 304, 305 are pre-selected while PO2, 302 is skipped due to its poor quality. Based on the time order, UE starts with the first pre-selected PO candidate which is PO1, 301 in this example. In item (1) UE switches on the RF RX to receive the wireless signals of PO1, 301. In item (2) UE detects PDCCH within the pre-configured CORESET within PO1, 301, but fails PDCCH decoding for all PDCCH candidates. In item (3), since PDCCH is not detected, UE switches off the RF RX to stop receiving PO1, 301. Hereby, since PO2, 302 is NOT pre-selected, UE keeps RF RX to off for PO2, 302. In item (4), UE re-opens RF RX to receive the signals of next pre-selected PO candidate which is PO3, 303. In item (5) UE detects PDCCH within the pre-configured CORESET within PO3, 303, and this time it successfully decodes the PDCCH. Then within PO3, 303, UE extracts the associated PDSCH signals which carries the paging message. In item (6) UE decodes extracted PDSCH but fails the CRC. In item (7), UE stores the PDSCH soft-bits (e.g. LLR) in the baseband buffer and in item (8) UE switches off the RF RX until the next pre-selected PO candidate arrives.

In item (9) UE re-opens the RF RX to receive the next pre-selected PO candidate which is PO4, 304. In item (10) UE again successfully decodes the PDCCH in PO4, 304. So, it further extracts the associated PDSCH within PO4, 304 which carries the repeated paging message. In item (11), UE generates the soft-bits from the PDSCH in PO4, 304, combines them with the pre-stored PDSCH soft-bits from PO3, 303 and then applies PDSCH decoding. This time, UE successfully decodes PDSCH with passing CRC. In item (12), since the paging message has already been successfully decoded, UE finishes the paging decoding in this DRX cycle by skipping all the follow-up POs (PO5, 305 in this example) within the burst, even if they have been pre-selected. In item (13) UE switches off the RF RX until the next DRX cycle.

Figure 4:
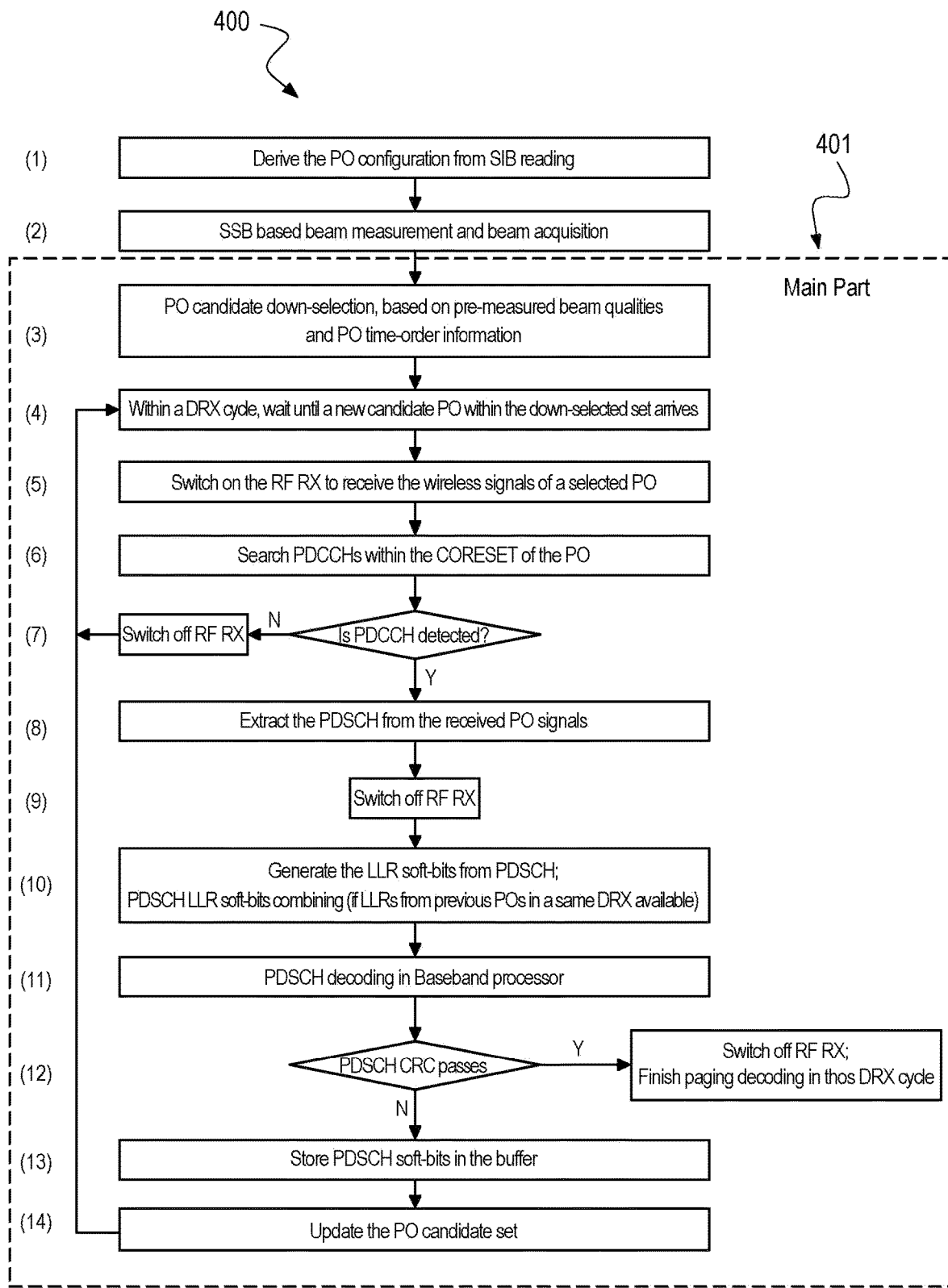
FIG. 4 is a schematic diagram illustrating an exemplary procedure for optimizing PO burst handling in 5G NR IDLE DRX operations according to the disclosure.

FIG. 4 is a schematic diagram illustrating an exemplary procedure for optimizing PO burst handling in 5G NR IDLE DRX operations according to the disclosure.

The procedures for realizing the disclosed methods as described above with respect to FIG. 3 are further shown in FIG. 4, in which the main parts 401 are highlighted within the dashed box. Within FIG. 4, in block (1), statistic PO configuration is retrieved from SIB (system information block) read. Hereby UE collects the information of time/frequency allocation pattern of PO bursts in IDLE mode. The UE also collects the association information between SSBs from the SSB burst and PO instances from the PO burst: A same TX beam can be assumed for a PO instance and an associated SSB. In block (2), UE applies SSB based beam acquisition. For FR1 (NR sub 6 GHz bands) operation only TX beam acquisition is applied. For FR2 (NR mmWave bands) operation, both TX beam acquisition and RX beam acquisition are applied. Unlike paging message which must be decoded every DRX cycle, SSB based beam acquisition can be spread over multiple DRX cycles with much lower activation rate. The selection of activation rate for SSB based beam acquisition can be adaptive based on UE mobility awareness or channel conditions.

Note that the exact SSB based beam acquisition algorithm is not the focus in this disclosure and can be generalized according to the following scenario: for example, it can be based on hierarchical beam sweeping or based on coherent measurement. By SSB based beam acquisition, UE obtained the measurement results of beam qualities (per TX beam for FR1, per TX/RX beam pair for FR2). The beam quality metric can be determined by L1-RSRP (Layer 1 received signal received power) measurement or SINR (signal-to-interference plus noise ratio) measurement or a combination of the two.

Within FIG. 4, block (3) to block (13) are the main parts 401 in this disclosure. In block (3), based on the beam quality measurement results (can be based on SSB measurements in block (2), or can be based on PO measurements in historical DRX cycles), as well as the beam association information from block (1), UE down-selects (or simply selects) a sub-set of high priority POs within the allocated PO burst for the target DRX cycle. Hereby, the priority to down-select a PO candidate from the PO burst can be jointly determined by the following two metrics:

1) Beam quality metric (from SSB measurements during beam acquisition steps, or from PO measurements during historical DRX cycles, or a combination of both) which is associated to a PO candidate in the upcoming DRX cycle; and/or 2) The time-order information of a PO candidate within a PO burst in the upcoming DRX cycle. It means the PO which is time allocated earlier within a PO bursts can have higher priority. That is because when UE pre-selects an earlier allocated PO but fails to decode it, UE still has the chance to decode the remaining POs which are later allocated within a DRX cycle. But when UE pre-selects a later allocated PO but fails to decode it, it suffers much higher penalty because there can be almost no remaining POs to continue with decoding for the current DRX cycle.

In block (4) of FIG. 4, based on the pre-selected PO candidate set, UE waits until a pre-selected PO candidate arrives. In block (5) UE switches on the RF RX to start receiving the DL signals this pre-selected PO candidate. In block (6) UE applies PDCCH detection within the CORE-SET region of the received PO signals. In block (7), when PDCCH is not detected, UE switches off the RF RX even though the remaining portion of the PO is not fully received. And then, the procedure goes back to block (4) to wait for the next pre-selected PO candidate.

In block (7), when PDCCH is successfully detected, the procedure goes to block (8). Hereby base on the PDSCH grant information from the decoded PDCCH, UE extracts PDSCH signals from the received PO signals. Afterwards, in block (9), UE can already early switch off the RF RX before PDSCH decoding is finished. That is because the remaining PDSCH processing can be done purely within baseband processor while the RFIC can already be switched OFF. In block (10), the extracted PDSCH signals are demodulated and the soft-bits (e.g. LLR, Log-Likelihood Ratio) are generated. Hereby, the UE checks whether there are pre-stored LLR soft bits from previous PO candidates within a same DRX cycle: if yes UE combines the LLR bits. In block (11) PDSCH LDPC decoding is applied based on the (combined) PDSCH LLR soft-bits.

In block (12), when PDSCH CRC passes, the paging message decoding in the current DRX cycle is claimed to be finished. Then UE turns off RF RX and skip all the remaining pre-selected PO candidates (if still present), until the next DRX cycle. In this case, the procedure for PO burst handling in the current DRX cycle can be terminated; When PDSCH CRC fails, the procedure goes to block (13), in which UE stores the generated PDSCH LLR soft-bits in the buffer so as to enable LLR combining for the next PO candidate in the same DRX cycle. And then, the procedure goes to block (14), hereby UE can update the PO candidate set. That is because, due to UE mobility, it may happen that all pre-selected PO candidates from a PO burst in a same DRX cycle are decoded but the PDSCH decoding still fails. In this case, according to our proposal, UE can dynamically revise the candidate set by including remaining POs in the same DRX cycle, even though they were not pre-selected. That is because in this extreme condition, UE needs to make use of the all remaining PO opportunities to have the best decoding sensitivity.

Figure 5:
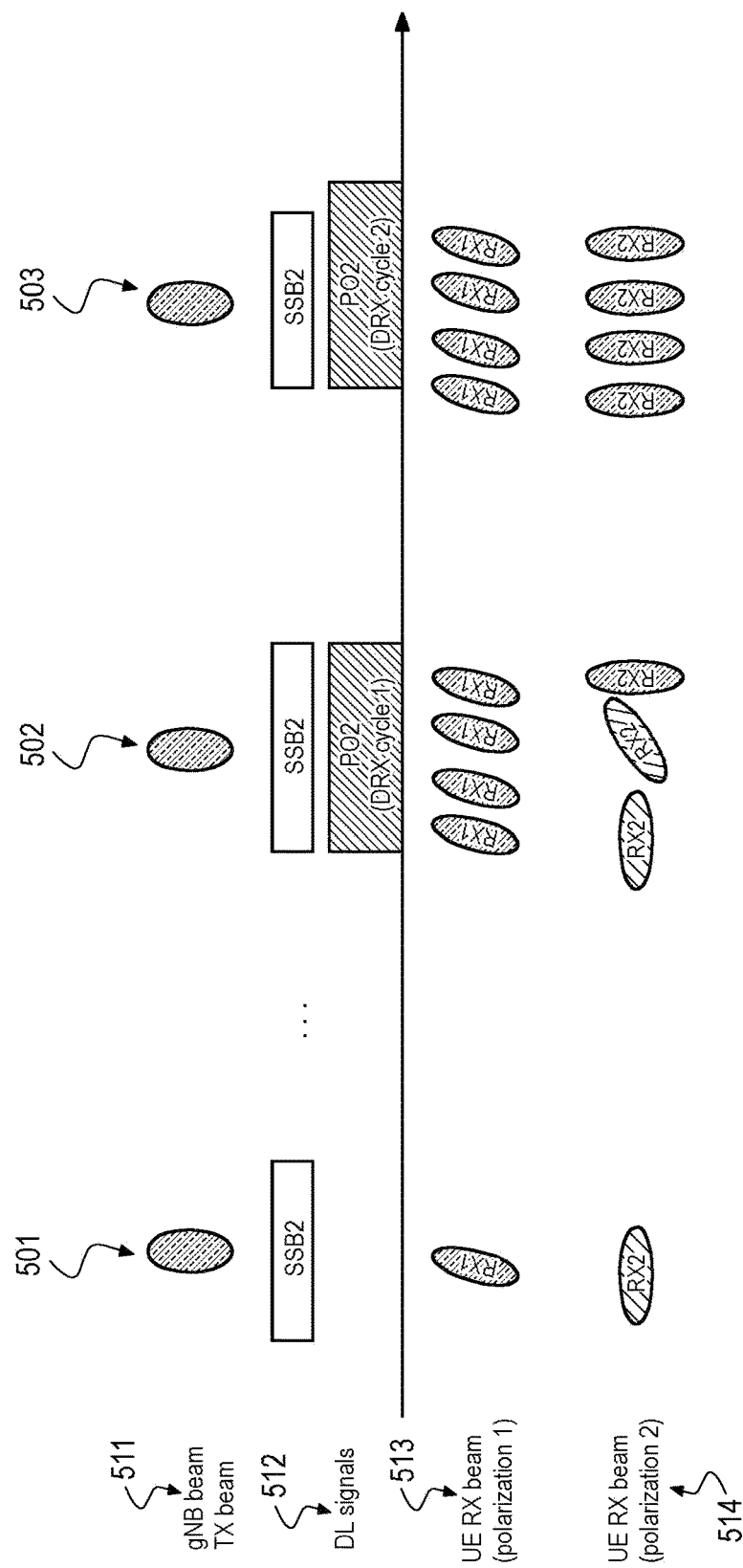
FIG. 5 is a schematic diagram illustrating an example of parallel RX beam acquisition and PO reception when PO-SSB are FDMed and when the PO is in single layer transmission during FR2 operations according to the disclosure.

FIG. 5 is a schematic diagram illustrating an example of parallel RX beam acquisition and PO reception when PO-SSB are FDMed and when the PO is in single layer transmission during FR2 operations according to the disclosure. In particular, FIG. 5 presents further optimizations for FR2 operation when a PO and the associated SSB are FDMed and when POs are configured to be single layer transmission.

FIG. 5 shows different states 501, 502, 503 of beam acquisition corresponding to different DRX cycles. The figure illustratively depicts gNB beam TX beam 511, DL signals 512, UE RX beam polarization (1), 513 and UE RX beam polarization (2), 514.

In the first state 501 polarization (2), 514, is still significantly worse after beam acquisition. The following relation holds: Beam quality of RX1 is larger than threshold A and beam quality of RX2 is less than Threshold B. In the second state 502 for polarization (2), 514, continue sweeping 3 further RX beam patterns over 3 SSB OFDM symbols, good RX beam is acquired at the last swept symbol. The following relation holds: beam quality of RX2 is larger than Threshold A. In the third state 503, applying the newly acquired beam pattern in polarization (2), 514 for PO reception in the next DRX cycle is shown.

For a pre-selected PO candidate, in an exemplary implementation UE can compare the pre-measured beam qualities from the two RX polarizations 513, 514. When one of the polarization is significantly weaker, UE selects only RX beam pattern corresponding to the strongest polarization for the PO reception (In this case UE applies SISO reception). Meanwhile, UE applies RX beam pattern sweeping in the weaker polarization to receive the FDMed SSB and makes use of the SSB measurements (in this example, a maximum number of 4 RX beam patterns can be swept for a SSB while each associated to one SSB symbol) to continue with RX beam acquisition for the weaker polarization. Such extension can reduce the RX on-duration overhead for FR2 RX beam acquisition because it is done in parallel with PO reception.

Figure 6:
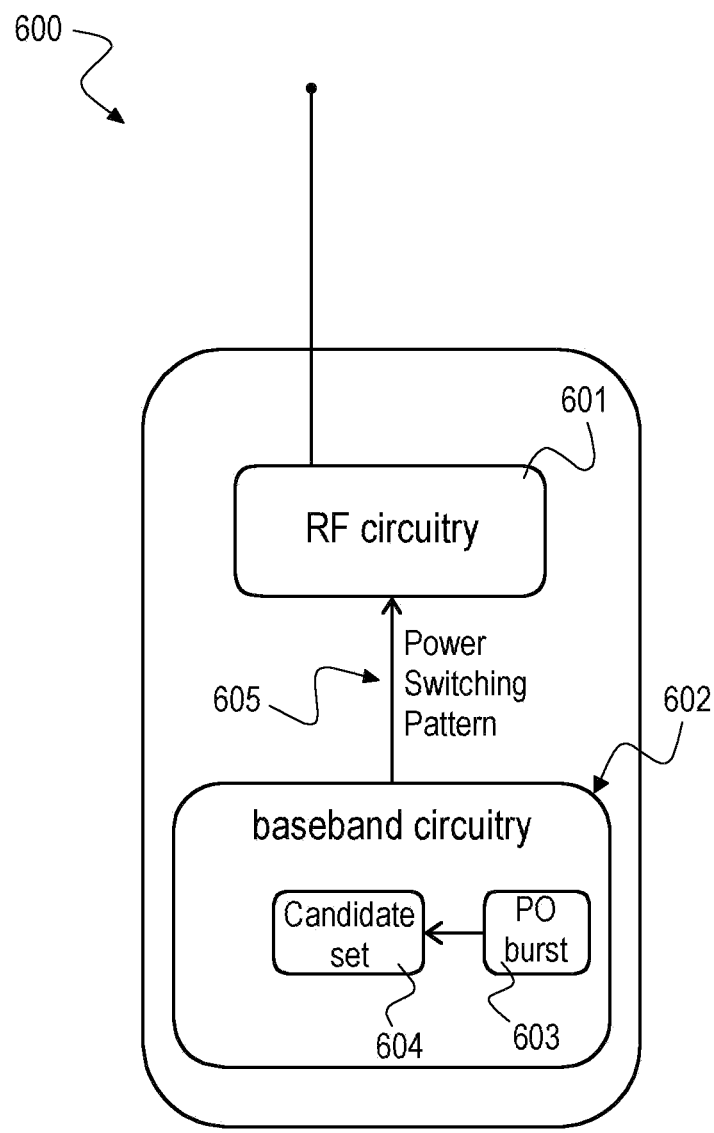
FIG. 6 is a block diagram illustrating an exemplary User Equipment (UE) circuitry according to the disclosure.

FIG. 6 is a block diagram illustrating an exemplary User Equipment (UE) circuitry 600 according to the disclosure. The UE circuitry can be applied in a UE, e.g. a UE 110 as described above with respect to FIG. 1.

The UE circuitry 600 includes a Radio Frequency, RF, circuitry 601 configured to receive RF signals from a serving cell, e.g. a base station 120 as described above with respect to FIG. 1. The RF signals include reference signals and a burst 603 of paging occasions, POs, e.g. a PO burst 111 as described above with respect to FIG. 1, within a Discontinuous Reception, DRX, cycle 112. The UE circuitry 600 further includes a baseband circuitry 602 which is configured to: select a candidate set 604 of POs from the burst of POs 603 based on a priority metric with respect to the reference signals. The baseband circuitry 602 is further configured to set a power switching pattern 605 of the RF circuitry 601 based on the selected candidate set 604 of POs. The baseband circuitry 602 may have the functionality as described above with respect to FIGS. 3 to 5.

Such a priority metric may be any metric that determines a characteristic value based on the reference signals, e.g. a quality, a power, a key performance indicator or any other evaluation that is characteristic for a specific property of the reference signals. Priority metric particularly means that the reference signals may be evaluated with respect to specific priorities. For example, early reference signals (in time) may have a larger weight when determining the metric than later signals (in time). Of course, any other priority relation can be applied.

Reference signals transmitted by the base station may be PDCCH DMRS or PDSCH DMRS from preceding POs or SSBs or any other signals providing a reference to the UE.

The baseband circuitry 602 may be configured to select the candidate set 604 of POs based on a control channel decoding status, e.g. as described above with respect to FIGS. 3 and 4. The baseband circuitry 602 may be configured to select the candidate set 604 of POs based on a data channel decoding status, e.g. as described above with respect to FIGS. 3 and 4. The baseband circuitry 602 may be configured to determine the priority metric for a PO candidate based on a beam quality determined from at least one signal block associated with the PO candidate. Such a signal block associated with the PO candidate may include a quasi co-located synchronization signal block, QCLed SSB, e.g. as defined by 5G NR specifications.

The baseband circuitry 602 may be configured to determine the priority metric for a PO candidate based on a beam quality determined from POs received in preceding DRX cycles, e.g. as described above with respect to FIGS. 2 to 4. The baseband circuitry 602 may be configured to determine the priority metric for a PO candidate based on a time order of the PO candidate within the burst of POs 603, e.g. as described above with respect to FIGS. 3 and 4. The baseband circuitry 602 may be configured to select the candidate set 604 of POs within a DRX cycle 112 or within multiple DRX cycles, e.g. as shown in FIG. 1.

A time and frequency allocation of the reference signals and the burst of POs 603 can be pre-determined by the serving cell. I.e. the serving cell knows all configurations and informs the UE circuitry 600 about the actual configuration as chosen by the network (or base station).

The baseband circuitry 602 may be configured to determine a ratio between a number of selected POs within the PO candidate set and a total number of POs within the PO burst based on at least one of or a combination of a mobility metric, a decoding state and a historical use of POs. The baseband circuitry 602 may be configured to determine the mobility metric based on UE speed information obtained from speed sensors and/or Doppler spread estimations based on received PDSCH and/or PDCCH DMRS within a PO from historical POs.

The baseband circuitry 602 may be configured to determine the priority metric based on a Received Signal Received Power, RSRP, measurement, a signal-to-noise ratio, SNR, measurement, and/or a signal-to-interference plus noise ratio, SINR, measurement of the reference signals.

The baseband circuitry 602 may be configured to: turn on the RF circuitry for receiving a selected PO candidate, and decode a control channel (e.g. PDCCH) included in the PO candidate. The baseband circuitry 602 may be configured to turn off the RF circuitry 601 until the next selected PO candidate if decoding the control channel fails.

The baseband circuitry 602 may be configured to decode a data channel (e.g. PDSCH) within the PO candidate, the data channel being associated with the control channel, if decoding the control channel succeeds. The control channel may include a Physical Downlink Control Channel, PDCCH. The associated data channel may include a Physical Downlink Shared Channel, PDSCH.

The baseband circuitry 602 may be configured to turn off the RF circuitry 601 without further receiving more selected PO candidates until the next DRX cycle if the data channel is successfully decoded which is indicated by a cyclic redundancy check pass, e.g. as described above with respect to FIGS. 3 and 4.

The baseband circuitry 602 may be configured to store PDSCH Logarithmic Likelihood Ratio, LLR, soft bits obtained from decoding the data channel if decoding the data channel fails, e.g. as described above with respect to FIGS. 3 and 4. The baseband circuitry 602 may further be configured to combine the PDSCH LLR soft bits with PDSCH LLR soft bits obtained from the data channel of the previously received PO candidates within the same DRX cycle. The baseband circuitry 602 may further be configured to decode the data channel of the next PO candidate by using the combined PDSCH LLR soft bits, e.g. as described above with respect to FIGS. 3 and 4.

The baseband circuitry 602 may be configured to revise the selection of the candidate set 604 of POs if decoding of the data channel of a last PO candidate within the DRX cycle still fails. The baseband circuitry 602 may be configured to revise the selection of the candidate set of POs by adding further POs from the burst of POs into the candidate set.

The RF circuitry 601 may be configured to receive RF beams of at least two receiver polarizations, e.g. as described above with respect to FIG. 5. The baseband circuitry 602 may be configured to determine the priority metric for each receiver polarization, e.g. as described above with respect to FIG. 5.

The RF circuitry 601 may be configured by the baseband circuitry 602 to receive the candidate set 604 of POs for the receiver polarizations if the corresponding priority metrics are higher than a pre-defined threshold. The RF circuitry 601 may be configured by the baseband circuitry 602 to perform receiver beam sweeping for the receiver polarizations if the corresponding priority metrics are lower than a pre-defined threshold, e.g. as described above with respect to FIG. 5. The baseband circuitry 602 may be configured to control the RF circuitry 601 performing the beam sweeping in parallel to receiving the candidate set of POs, e.g. as described above with respect to FIG. 5.

Figure 7:
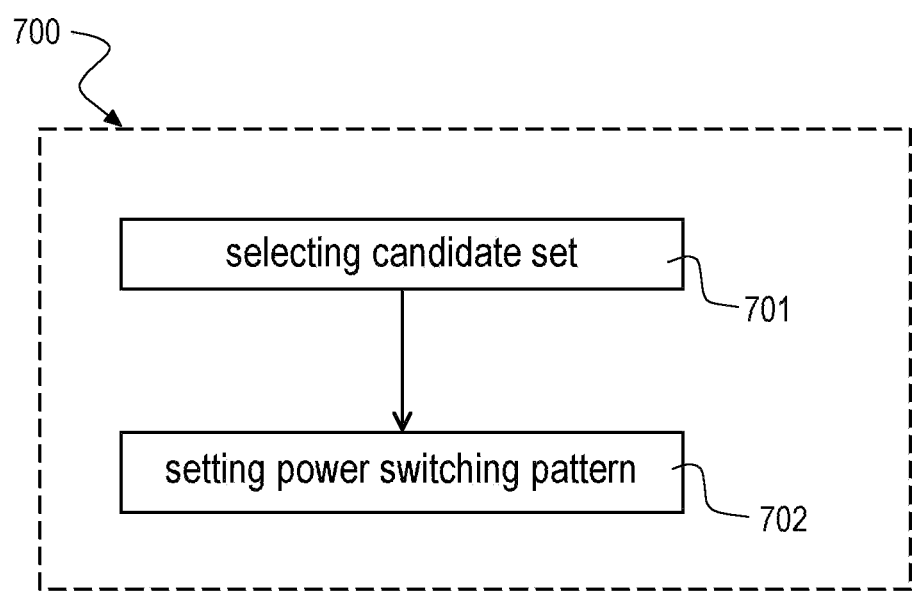
FIG. 7 is a schematic diagram illustrating an exemplary method for power switching an RF receiver of a UE according to the disclosure.

FIG. 7 is a schematic diagram illustrating an exemplary method 700 for power switching an RF receiver of a UE according to the disclosure. The method 700 corresponds to the functionality of the UE circuitry 600 described above with respect to FIG. 6, in particular the functionality of the baseband circuitry 602. The RF receiver may correspond to the RF circuitry 601 as described above with respect to FIG. 6. The UE may be a UE 110 as described above with respect to FIG. 1.

The method 700 includes selecting 701 a candidate set of Paging Occasions, POs, from a burst of POs received by the RF receiver, wherein the selection is based on a priority metric with respect to reference signals received by the RF receiver, wherein the reference signals are associated to the POs. The method 700 further includes setting 702 a power switching pattern of the RF circuitry based on the selected candidate set of POs.

The method 700 may further include selecting the candidate set of POs based on a control channel decoding status. The method 700 may further include selecting the candidate set of POs based on a data channel decoding status. A time and frequency allocation of the reference signals and the burst of POs may be pre-determined by a serving cell.

The present disclosure also supports a computer program product including computer executable code or computer executable instructions that, when executed, causes at least one computer to execute the performing and computing blocks described herein, in particular the methods and procedures described above with respect to FIGS. 3 to 5 and 7 and the computing blocks described above with respect to FIG. 6. Such a computer program product may include a non-transitory readable storage medium storing program code thereon for use by a processor, the program code including instructions for performing the methods or the computing blocks as described above.

EXAMPLES

The following examples pertain to further aspects of the disclosure. Example 1 is a User Equipment, UE, circuitry, including: a Radio Frequency, RF, circuitry, configured to receive RF signals from a serving cell, the RF signals including reference signals and a burst of paging occasions, POs within a Discontinuous Reception, DRX, cycle; and a baseband circuitry, configured to: select a candidate set of POs from the burst of POs based on a predetermined priority metric with respect to the reference signals, and set a power switching pattern of the RF circuitry based on the selected candidate set of POs.

In Example 2, the subject matter of Example 1 can optionally include that the baseband circuitry is configured to select the candidate set of POs based on a control channel decoding status.

In Example 3, the subject matter of Example 1 or 2 can optionally include that the baseband circuitry is configured to select the candidate set of POs based on a data channel decoding status.

In Example 4, the subject matter of Example 1 or 2 can optionally include that the baseband circuitry is configured to determine the priority metric for a PO candidate based on a beam quality determined from at least one signal block associated with the PO candidate.

In Example 5, the subject matter of Example 4 can optionally include that the at least one signal block associated with the PO candidate includes a quasi co-located synchronization signal block, QCLed SSB.

In Example 6, the subject matter of Example 1 or 2 can optionally include that the baseband circuitry is configured to determine the priority metric for a PO candidate based on a beam quality determined from POs received in preceding DRX cycles.

In Example 7, the subject matter of Example 1 or 2 can optionally include that the baseband circuitry is configured to determine the priority metric for a PO candidate based on a time order of the PO candidate within the burst of POs.

In Example 8, the subject matter of Example 1 or 2 can optionally include that the baseband circuitry is configured to select the candidate set of POs within a DRX cycle or within multiple DRX cycles.

In Example 9, the subject matter of Example 1 or 2 can optionally include that a time and frequency allocation of the reference signals and the burst of POs are pre-determined by the serving cell.

In Example 10, the subject matter of Example 1 or 2 can optionally include that the baseband circuitry is configured to determine a ratio between a number of selected POs within the PO candidate set and a total number of POs within the PO burst based on at least one of or a combination of a mobility metric, a decoding state and a historical use of POs.

In Example 11, the subject matter of Example 10 can optionally include that the baseband circuitry is configured to determine the mobility metric based on at least one or a combination of: UE speed information obtained from speed sensors; or Doppler spread estimations based on PDSCH and/or PDCCH DMRS within a PO from historical POs.

In Example 12, the subject matter of Example 1 or 2 can optionally include that the baseband circuitry is configured to determine the priority metric based on at least one of or a combination of: a Received Signal Received Power, RSRP, measurement, a signal-to-noise ratio, SNR, measurement, or a signal-to-interference plus noise ratio, SINR, measurement of the reference signals which are associated to the POs.

In Example 13, the subject matter of Example 1 or 2 can optionally include that the baseband circuitry is configured to: turn on the RF circuitry for receiving a selected PO candidate, and decode a control channel included in the PO candidate.

In Example 14, the subject matter of Example 13 can optionally include that the baseband circuitry is configured to: turn off the RF circuitry until the next selected PO candidate if decoding the control channel fails.

In Example 15, the subject matter of Example 13 can optionally include that the baseband circuitry is configured to: decode a data channel within the PO candidate, the data channel being associated with the control channel, if decoding the control channel succeeds.

In Example 16, the subject matter of Example 15 can optionally include that the control channel includes a Physical Downlink Control Channel, PDCCH, and that the associated data channel includes a Physical Downlink Shared Channel, PDSCH.

In Example 17, the subject matter of Example 15 can optionally include that the baseband circuitry is configured to: turn off the RF circuitry without further receiving more selected PO candidates until the next DRX cycle if the data channel is successfully decoded which is indicated by a cyclic redundancy check pass.

In Example 18, the subject matter of Example 15 can optionally include that the baseband circuitry is configured to: store PDSCH Logarithmic Likelihood Ratio, LLR, soft bits obtained from decoding the data channel if decoding the data channel fails.

In Example 19, the subject matter of Example 18 can optionally include that the baseband circuitry is configured to: combine the PDSCH LLR soft bits with PDSCH LLR soft bits obtained from the data channel of the previously received PO candidates within the same DRX cycle.

In Example 20, the subject matter of Example 19 can optionally include that the baseband circuitry is configured to: decode the data channel of the next PO candidate by using the combined PDSCH LLR soft bits.

In Example 21, the subject matter of Example 20 can optionally include that the baseband circuitry is configured to: revise the selection of the candidate set of POs if decoding of the data channel of a last PO candidate within the DRX cycle still fails.

In Example 22, the subject matter of Example 21 can optionally include that the baseband circuitry is configured to: revise the selection of the candidate set of POs by adding further POs from the burst of POs into the candidate set.

In Example 23, the subject matter of Example 1 or 2 can optionally include that the RF circuitry is configured to receive RF beams of at least two receiver polarizations, and that the baseband circuitry is configured to determine the priority metric for each receiver polarization.

In Example 24, the subject matter of Example 23 can optionally include that the RF circuitry is configured by the baseband circuitry to receive the candidate set of POs for the receiver polarizations if the corresponding priority metrics are higher than a pre-defined threshold.

In Example 25, the subject matter of Example 24 can optionally include that the RF circuitry is configured by the baseband circuitry to perform receiver beam sweeping for the receiver polarizations if the corresponding priority metrics are lower than a pre-defined threshold.

In Example 26, the subject matter of Example 25 can optionally include that the baseband circuit is configured to control the RF circuitry performing the beam sweeping in parallel to receiving the candidate set of POs.

Example 27 is a processing circuit for a User Equipment, UE, wherein the UE includes a radio frequency, RF, receiver, wherein the processing circuit is configured to: select a candidate set of Paging Occasions, POs, from a burst of POs received by the RF receiver, wherein the selection is based on a predetermined priority metric with respect to reference signals received by the RF receiver, and set a power switching pattern of the RF circuitry based on the selected candidate set of POs.

In Example 28, the subject matter of Example 27 can optionally include that a time and frequency allocation of the reference signals and the burst of POs are pre-determined by a serving cell.

In Example 29, the subject matter of Example 27 or 28 can optionally include that the processing circuit is configured to select the candidate set of POs based on a control channel decoding status.

In Example 30, the subject matter of Example 27 or 28 can optionally include that the processing circuit is configured to select the candidate set of POs based on a data channel decoding status.

Example 31 is a method for power switching a radio frequency, RF, receiver of a User Equipment, UE, wherein the method includes: selecting a candidate set of Paging Occasions, POs, from a burst of POs received by the RF receiver, wherein the selection is based on a predetermined priority metric with respect to reference signals received by the RF receiver; and setting a power switching pattern of the RF circuitry based on the selected candidate set of POs.

In Example 32, the subject matter of Example 31 can optionally include: selecting the candidate set of POs based on a control channel decoding status.

In Example 33, the subject matter of Example 31 or 32 can optionally include: selecting the candidate set of POs based on a data channel decoding status.

In Example 34, the subject matter of Example 31 or 32 can optionally include that a time and frequency allocation of the reference signals and the burst of POs are pre-determined by a serving cell.

Example 35 is a device for power switching a radio frequency, RF, receiver of a User Equipment, UE, wherein the device includes: means for selecting a candidate set of Paging Occasions, POs, from a burst of POs received by the RF receiver, wherein the selection is based on a predetermined priority metric with respect to reference signals received by the RF receiver; and means for setting a power switching pattern of the RF circuitry based on the selected candidate set of POs.

In Example 36, the subject matter of Example 35 can optionally include means for selecting the candidate set of POs based on a control channel decoding status.

In Example 37, the subject matter of Example 35 or 36 can optionally include means for selecting the candidate set of POs based on a data channel decoding status.

Example 38 is a system-on-chip, including: a Radio Frequency, RF, circuitry, configured to receive RF signals from a serving cell, the RF signals including reference signals and a burst of paging occasions, POs within a Discontinuous Reception, DRX, cycle; and a baseband circuitry, configured to: select a candidate set of POs from the burst of POs based on a predetermined priority metric with respect to the reference signals, and set a power switching pattern of the RF circuitry based on the selected candidate set of POs.

In Example 39, the subject matter of Example 38 can optionally include that the baseband circuitry is configured to select the candidate set of POs based on a control channel decoding status.

Example 40 is a computer readable non-transitory medium on which computer instructions are stored which when executed by a computer cause the computer to perform the method of any one of Examples 31 to 34.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "include". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

The invention claimed is:

1. A User Equipment, UE, circuitry, comprising:
a Radio Frequency, RF, circuitry, configured to receive RF signals from a serving cell, the RF signals comprising reference signals and a burst of paging occasions within a Discontinuous Reception, DRX, cycle; and
a baseband circuitry, configured to:
select a candidate set of paging occasions from the burst of paging occasions based on a predetermined priority metric with respect to the reference signals, and
set a power switching pattern of the RF circuitry based on the selected candidate set of paging occasions.

2. The UE circuitry of claim 1,
wherein the baseband circuitry is configured to select the candidate set of paging occasions based on a control channel decoding status.

3. The UE circuitry of claim 1,
wherein the baseband circuitry is configured to select the candidate set of paging occasions based on a data channel decoding status.

4. The UE circuitry of claim 1,
wherein the baseband circuitry is configured to determine the priority metric for a paging occasion candidate based on a beam quality determined from at least one signal block associated with the paging occasion candidate.

5. The UE circuitry of claim 4,
wherein the at least one signal block associated with the paging occasion candidate comprises a quasi co-located synchronization signal block, QCLed SSB.

6. The UE circuitry of claim 1,
wherein the baseband circuitry is configured to determine the priority metric for a paging occasion candidate based on a beam quality determined from paging occasions received in preceding DRX cycles.

7. The UE circuitry of claim 1,
wherein the baseband circuitry is configured to determine the priority metric for a paging occasion candidate based on a time order of the paging occasion candidate within the burst of paging occasions.

8. The UE circuitry of claim 1,
wherein the baseband circuitry is configured to select the candidate set of paging occasions within a DRX cycle or within multiple DRX cycles.

9. The UE circuitry of claim 1,
wherein the baseband circuitry is configured to determine a ratio between a number of selected paging occasions within the paging occasion candidate set and a total number of paging occasions within the paging occasion burst based on at least one of or a combination of a mobility metric, a decoding state and a historical use of paging occasions.

10. The UE circuitry of claim 9,
wherein the baseband circuitry is configured to determine the mobility metric based on at least one or a combination of:
UE speed information obtained from speed sensors; or
Doppler spread estimations based on received PDSCH and/or PDCCH DMRS within a paging occasion from historical paging occasions.

11. The UE circuitry of claim 1, wherein the baseband circuitry is configured to:
turn on the RF circuitry for receiving a selected paging occasion candidate, and
decode a control channel comprised in the paging occasion candidate.

12. The UE circuitry of claim 11, wherein the baseband circuitry is configured to:
turn off the RF circuitry until the next selected paging occasion candidate if decoding the control channel fails.

13. The UE circuitry of claim 11, wherein the baseband circuitry is configured to:
decode a data channel within the paging occasion candidate, the data channel being associated with the control channel, if decoding the control channel succeeds.

14. The UE circuitry of claim 13, wherein the baseband circuitry is configured to:
turn off the RF circuitry without further receiving more selected paging occasion candidates until the next DRX cycle if the data channel is successfully decoded which is indicated by a cyclic redundancy check pass.

15. The UE circuitry of claim 13, wherein the baseband circuitry is configured to:
store PDSCH Logarithmic Likelihood Ratio, LLR, soft bits obtained from decoding the data channel if decoding the data channel fails, and
combine the PDSCH LLR soft bits with PDSCH LLR soft bits obtained from the data channel of the previously received paging occasion candidates within the same DRX cycle.

16. The UE circuitry of claim 1,
wherein the RF circuitry is configured to receive RF beams of at least two receiver polarizations, and
wherein the baseband circuitry is configured to determine the priority metric for each receiver polarization.

17. The UE circuitry of claim 16,
wherein the RF circuitry is configured by the baseband circuitry to receive the candidate set of paging occasions for the receiver polarizations if the corresponding priority metrics are higher than a pre-defined threshold.

18. A method for power switching a radio frequency, RF, receiver of a User Equipment, UE, wherein the method comprises:
selecting a candidate set of Paging Occasions, paging occasions, from a burst of paging occasions received by the RF receiver, wherein the selection is based on a predetermined priority metric with respect to reference signals received by the RF receiver; and
setting a power switching pattern of the RF circuitry based on the selected candidate set of paging occasions.

19. The method of claim 18, comprising:
selecting the candidate set of paging occasions based on a control channel decoding status.

20. A computer readable non-transitory medium on which computer instructions are stored which when executed by a computer cause the computer to:
select a candidate set of Paging Occasions, paging occasions, from a burst of paging occasions received by the RF receiver, wherein the selection is based on a predetermined priority metric with respect to reference signals received by the RF receiver; and
set a power switching pattern of the RF circuitry based on the selected candidate set of paging occasions.

* * * * *